(12) United States Patent
Rangarajan et al.

(10) Patent No.: US 10,558,642 B2
(45) Date of Patent: *Feb. 11, 2020

(54) MECHANISM FOR DEPRECATING OBJECT ORIENTED DATA

(71) Applicant: BMC Software, Inc., Houston, TX (US)

(72) Inventors: Govindarajan Rangarajan, San Jose, CA (US); Narayan Kumar, Santa Clara, CA (US)

(73) Assignee: BMC Software, Inc., Houston, TX (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/700,932

(22) Filed: Sep. 11, 2017

(65) Prior Publication Data

US 2018/0004794 A1 Jan. 4, 2018

Related U.S. Application Data

(63) Continuation of application No. 14/659,002, filed on Mar. 16, 2015, now Pat. No. 9,760,589, which is a
(Continued)

(51) Int. Cl.
*G06F 17/30* (2006.01)
*G06F 16/23* (2019.01)
(Continued)

(52) U.S. Cl.
CPC .......... *G06F 16/235* (2019.01); *G06F 16/162* (2019.01); *G06F 16/289* (2019.01); *G06F 16/86* (2019.01); *G06F 17/243* (2013.01)

(58) Field of Classification Search
CPC .... G06F 16/235; G06F 16/289; G06F 16/162; G06F 16/86; G06F 17/243
See application file for complete search history.

(56) References Cited

U.S. PATENT DOCUMENTS

| 7,979,413 B2 | 7/2011 | Krishnamurthy et al. |
| 8,146,054 B2 | 3/2012 | Baker et al. |
| (Continued) | | |

OTHER PUBLICATIONS

"Inline", retrieved from: http://www.jetbrains.com/idea/webhelp/inline.pdf, Mar. 11, 2014, 3 pages.
(Continued)

*Primary Examiner* — Huawen A Peng
(74) *Attorney, Agent, or Firm* — Brake Hughes Bellermann LLP

(57) ABSTRACT

Techniques are described to allow the deprecation of classes in an object-oriented data model, such as a CDM for a CMDB. When a class is deprecated and replaced by another existing or new class, data associated with instances of the deprecated class may be migrated to the replacement class. A mapping between the deprecated class and its replacement class may be provided to allow existing applications to continue to access data using the deprecated class without change until the deprecated class is finally deleted or the application is updated to use the replacement class. New applications written to use the object-oriented data model after the deprecation may use the replacement class to access data instances created using the original data model.

20 Claims, 13 Drawing Sheets

Related U.S. Application Data continuation of application No. 12/750,291, filed on Mar. 30, 2010, now Pat. No. 8,983,982.

(60) Provisional application No. 61/289,342, filed on Dec. 22, 2009.

(51) Int. Cl.
*G06F 16/84* (2019.01)
*G06F 16/16* (2019.01)
*G06F 16/28* (2019.01)
*G06F 17/24* (2006.01)

(56) References Cited

U.S. PATENT DOCUMENTS

| | | |
|---|---|---|
| 8,200,613 B1 | 6/2012 | Wan et al. |
| 8,296,730 B2 | 10/2012 | Whitechapel et al. |
| 8,667,028 B2 | 3/2014 | Franz |
| 8,892,504 B2 | 11/2014 | Wan |
| 8,983,982 B2 | 3/2015 | Rangarajan et al. |
| 9,053,460 B2 | 6/2015 | Gilbert et al. |
| 2006/0282458 A1 | 12/2006 | Tsyganskiy et al. |
| 2008/0134156 A1* | 6/2008 | Osminer ............ G06F 9/44589 717/140 |
| 2008/0183724 A1 | 7/2008 | Mueller |
| 2009/0049065 A1 | 2/2009 | Weissman |
| 2009/0157728 A1 | 6/2009 | Fletcher et al. |
| 2010/0306274 A1 | 12/2010 | Chen et al. |
| 2011/0153559 A1 | 6/2011 | Rangarajan et al. |

OTHER PUBLICATIONS

"Inline Variable", retrieved from: http://web.archive.org/web/20080515194643/http://www.jetbrains.com/resharper/documentation/help20/Refactoring/inlineVariable.html, May 15, 2008, 1 page.

* cited by examiner

BEFORE DEPRECATION

AFTER DEPRECATION

BEFORE DEPRECATION

AFTER DEPRECATION

MECHANISM FOR DEPRECATING OBJECT ORIENTED DATA

CROSS REFERENCE TO RELATED APPLICATIONS

This Application is a continuation of U.S. application Ser. No. 14/659,002 entitled "A Mechanism for Deprecating Object Oriented Data", filed on Mar. 16, 2015, which claims priority to U.S. application Ser. No. 12/750,291 entitled "A Mechanism to Deprecate Object Oriented Data", filed Mar. 30, 2010, now U.S. Pat. No. 8,983,982, which claims priority to U.S. Provisional Application Ser. No. 61/289,342 entitled "A Mechanism to Deprecate Object Oriented Data" filed Dec. 22, 2009, which are incorporated by reference in their entirety herein.

BACKGROUND

This disclosure relates generally to the field of computer software. More particularly, but not by way of limitation, it relates to a method of allowing changes to an object-oriented data model that allows older versions of the model to co-exist with newer versions of the model, such that both existing applications and new ones may continue to operate seamlessly without any changes or disruption.

Today applications often store business information in repositories in an object-oriented fashion. Typically, well-defined schemas or models describe how the data may be stored and accessed. In general, the model describes the various classes, the class hierarchy and how the classes can be associated. Applications rely on the information in the model to perform operations on the data stored in the repository.

Situations may arise that may warrant changes to a model. The changes might be related to changing a class definition, deleting a class, introducing a new class, etc. Such changes to the model are often very disruptive to existing consuming applications. In such scenarios, the existing and already functioning applications that were working well before typically stop working and have to be suitably updated or patched before they may continue to work.

One such repository is a Configuration Management Database (CMDB) that uses an object-oriented model called the Common Data Model (CDM). As new technologies emerge and standards evolve, the CDM has to be updated to keep up with the changes. In the past, there have been instances where changes were made to the CDM that compromised backward compatibility. Such incompatible changes have been disruptive to both consumers and providers of the CMDB. Typically, different applications interact with the CMDB for various reasons and those applications must be patched after making changes to the CDM. What is needed is a mechanism that would facilitate changes to the data model without breaking the consuming applications. In other words, the mechanism should allow the old model to co-exist with the newly updated model, such that both existing applications and new ones may continue to operate seamlessly without any changes or disruption.

SUMMARY

In one embodiment, a method is disclosed. The method comprises deprecating a first class of an object-oriented model of a computer-implemented database; selecting a second class of the object-oriented model as a replacement for the first class; and migrating data associated with a first instance of the first class to a second instance of the second class.

In another embodiment, a computer readable medium is disclosed. The computer has instructions for a programmable control device stored thereon wherein the instructions cause a programmable control device to perform the method described above.

In yet another embodiment, a networked computer system is disclosed. The networked computer system comprises a plurality of computers communicatively coupled, at least one of the plurality of computers programmed to perform at least a portion of the method of described above wherein the entire method described above is performed collectively by the plurality of computers.

DETAILED DESCRIPTION

Figure 1:
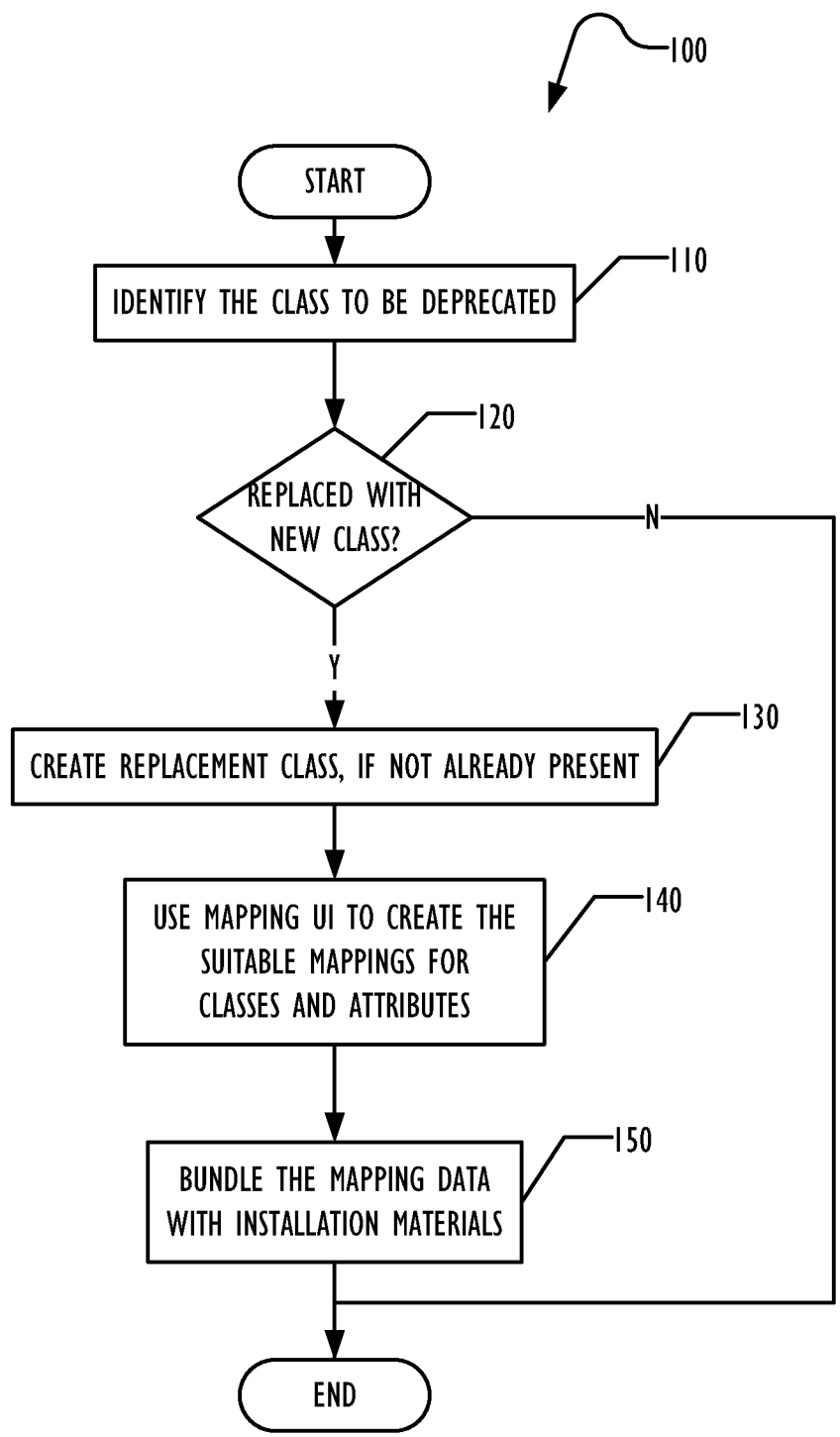
FIG. 1 illustrates, in flowchart form, an example of a technique for deprecating object-oriented data according to one embodiment.

The techniques and embodiments described below allow the deprecation of classes in an object-oriented data model. When a class is deprecated and replaced by another existing or new class, data associated with instances of the deprecated class may be migrated to the replacement class. Existing applications written to use the object-oriented data model may continue to access data using the deprecated class without change until the deprecated class is finally deleted or the application is updated to use the replacement class. New applications written to use the object-oriented data model after the deprecation may use the replacement class to access data instances created using the original data model.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment. The order of actions described below is illustrative and by way of example only, and other actions and other orders of taking those actions may be performed as desired.

Although the following description is written in terms of a CMDB and deprecating classes in a CDM, the disclosed techniques are not limited to such a context, and may be used in any situation in which object-oriented classes and data are desired to be deprecated, while allowing existing applications to continue to function without change during the deprecation period.

A CMDB represents the authorized configuration of the significant components of an information technology (IT) environment. Those components may include hardware components, software components, people, and services provided by the IT environment. A CMDB helps an organization understand the relationships between these components and track their configuration. CMDB implementations often involve federation, the inclusion of data into the CMDB from other sources in such a way that the source of the data retains control of the data.

The CMDB records configuration items (CI) and details about the important attributes and relationships between CIs. Examples of CIs include individual requirements documents, hardware, software, models, plans, and people. The CDM typically models not only the components themselves, but also the relationships between those components. For example, a group of hardware devices that is a collection of subcomponents may use a class for modeling the hardware device, and one or more subclasses that model the hardware subcomponents that are used in the hardware device, to allow tracking changes to the hardware device at the device level, at the subcomponent level, or both. In another example, software that is installed on a hardware device may be modeled with relationships between the software and the hardware device, allowing the IT organization to understand, among other things, what software may be affected by a change or problem affecting a hardware device, or where updates to the software may need to be installed.

The CDM is metadata that describes or models the data representing the real-world components that is contained in the CMDB, and can be used to address how the CMDB data is to be manipulated.

Providing the capability to deprecate classes in a CDM will minimize disruption to consuming applications and also help preserve and maintain the backward compatibility of the CDM. If a decision is made that an existing class should be deleted or replaced with a new class, then the existing class may be deprecated. Existing applications referring to a deprecated class should continue to function correctly using the deprecated classes and new applications may use the new class that replaces the deprecated class.

The disclosed techniques are applicable to classes shipped by a CMDB vendor as well as for classes created by consumer applications. In some embodiments, there may be a boundary between applications delineating which application may deprecate which classes. In such embodiments, the owner of the class, typically the creator of the class, may decide whether to deprecate the class. For example, if SoftwareServer is a class shipped by a CMDB vendor and a discovery application extends that class and creates an OracleAppServer class, the CMDB may be the owner of the SoftwareServer class and the discovery application may be the owner of the OracleAppServer class. If an ownership rule is enforced, then only the discovery application, as owner of the class, may decide whether to deprecate the OracleAppServer class. Some embodiments may not enforce an ownership rule, in which case any application may deprecate any class.

Embodiments described below provide mapping information about the classes and attributes that are going to be deprecated. This mapping information may be provided by the owner of the class when the decision is made to deprecate the class. Various embodiments will change the class model such that interfaces of the class and the behavior of CMDB client applications do not need to change. Data associated with deprecated classes may be migrated to a new location, without duplicating the data in the CMDB.

Before going further, a brief overview of deprecation may be in order. Deprecation of a class and its attributes implies that the class and attributes are going to be removed in the future, with either the class or one or more attributes being deleted or replaced by another class or attribute. How long the deprecation period extends is up to the owner of the class that is deprecated. Deprecation allows some time for old applications to migrate to the new class model. During this time the old applications may continue to work as before. At the end of the deprecation period, the deprecated class may be deleted. The deprecation period provides time for end-users to modify or replace all of the applications that rely on the deprecated class.

A CDM class may be considered a candidate for deprecation if either the class is to be replaced by a new class or the class is to be deleted, such as when the class is considered obsolete. In some embodiments, suitable indicators may indicate that a class is deprecated. The CMDB create/update/delete (CRUD) metadata application programming interfaces (APIs) may continue in use on deprecated classes. CMDB API clients may still extend classes or add attributes in the deprecated classes. In one embodiment, appropriate warning messages may be logged when operating on a deprecated class.

CRUD operations may continue to act on deprecated class instances. If a replacement class is defined for the deprecated class, data associated with deprecated classes may be migrated so that it may be accessed though the replacement class, but remains accessible through the deprecated class. The CMDB data is not duplicated during the data migration, but is moved according to the mapping for deprecated classes attributes.

Deprecation has been available in programming languages such as the JAVA programming language. (JAVA is a registered trademark of Sun Microsystems.) The deprecation in the context of a programming language, however, has merely meant that a feature of the language is flagged as deprecated. The compiler or interpreter compiling or interpreting source code written in the programming language typically generates the same executable code as before the deprecation, but produces a warning message noting the feature is deprecated, sometimes with a message suggesting how the programmer should modify the program to eliminate the deprecated feature.

Deprecation of a class in object-oriented data model as disclosed herein, in contrast, involves modifying a data model that is used by applications that are already written to use the data model. The data model should be changed in such a way that old applications can interact with it without change, allowing new applications written to the changed data model and old applications written to the original data model to access data instances that were created using the original data model. This involves more than merely flagging a class of the data model as deprecated.

When a class is deprecated, it may be deprecated with no replacement class. Alternately, it may be deprecated and replaced either by another existing class or by a new class. When deprecating a class, and replacing the deprecated class with another class, some or all of the attributes of the deprecated may be mapped to existing or new attributes of the target class.

In one embodiment, a relationship can be mapped to another relationship if the endpoint classes are the same or they are the superclasses, and the cardinality constraint is more permissive. In such an embodiment, a 1-1 relationship can be mapped to a 1-many relationship, but a 1-many relationship may not be mapped to a 1-1 relationship. In other embodiments, these constraints may be eliminated or relaxed.

Similarly, when an attribute of a class is deprecated, it may be deprecated with no replacement attribute. Alternately, it may be deprecated and replaced either by another existing attribute or by a new attribute of a different class. In one embodiment, an attribute may be deprecated and replaced by a single other attribute, without transformation or concatenation of the attribute. For example, the data type of the replacement attribute is the same as the data type of the attribute being deprecated, even though the attribute is now an attribute of a different class.

In one embodiment, the following use cases for class deprecation are supported. A leaf class may be deprecated and replaced with its superclass. A superclass may be deprecated, along with all of its subclasses. A class may be deprecated and replaced with a sibling class. A class may be deprecated and replaced with a sibling class of its superclass. A class may be deprecated and replaced with a class in another class hierarchy. One or more attributes of the class may be deprecated.

In one embodiment, a utility may be provided to perform the deprecation function. The utility provides the mechanism for deprecating a class or attribute, and also provides a mechanism for migrating the data associated with the deprecated class or attribute. A property may be added to the CMDB metadata to indicate whether the class or attribute is deprecated. The utility may be written in any desired programming language, such as the JAVA programming language.

In one embodiment, if the class is to be deprecated and replaced with a new class, then the new class may be created prior to execution of the utility. In one embodiment, only an owner of the class to be deprecated may deprecate the class.

The deprecation utility may use a class/attributes mapping as input. Any suitable user interface may be provided to allow the user to create, modify, or delete class mappings for deprecation, including loading of a pre-defined mapping. If the class or attribute to be deprecated is not to be replaced by another class or attribute, then the mapping may not be required, and the utility in one embodiment may simply mark the class or attribute as deprecated.

The mapping data may be stored in CMDB configuration classes. After the mapping is completed, then the mapping information may be bundled with installation materials for the CMDB to allow use of the deprecated classes by existing applications. The deprecation utility may then use the mapping data to deprecate the classes in the data model and suitably modify the corresponding data structures.

FIG. 1 is a flowchart illustrating a technique 100 for establishing the mapping for use by the deprecation utility according to one embodiment in which the data model is a CDM for a CMDB.

In block 110, a class to be deprecated may be identified. If multiple classes are to be deprecated, then a list of such classes may be created and the actions of blocks 120-150 may be performed for each member of the list. In block 120 if the deprecated class is not to be replaced with another class, blocks 130-150 may be skipped. In block 130, any non-existing class that is to replace the deprecated class may be created. In block 140, the mapping user interface of the utility may be used to create suitable mappings for the deprecated class and its attributes, mapping them to their replacement as desired. In block 150, the mapping data may be bundled with installation materials for the CMDB, to allow customers to modify the CMDB to use the modified CDM, while allowing existing CMDB applications to continue to function without change.

In one embodiment, the deprecation utility may be provided in the installation procedure for the CMDB. The installation/upgrade process for the CMDB and applications bundled with the CMDB may invoke this utility to perform the class deprecation function and the data migration function. The utility may adjust the internal structure of the CMDB such that CRUD operations via the CMDB API may work without change to old applications, redirecting or mapping CRUD operations on the deprecated class to operate on the replacement class. Once the internal data structure is adjusted, the utility may migrate the data from the deprecated class to the mapped or target class according to the previously defined attribute mapping. During the migration of the CI instances, the value of an attribute such as "classID" may be changed to the mapped class ID, but values of other attributes such as an instance ID may not change. The utility may mark the class or attribute as deprecated.

Figure 2:
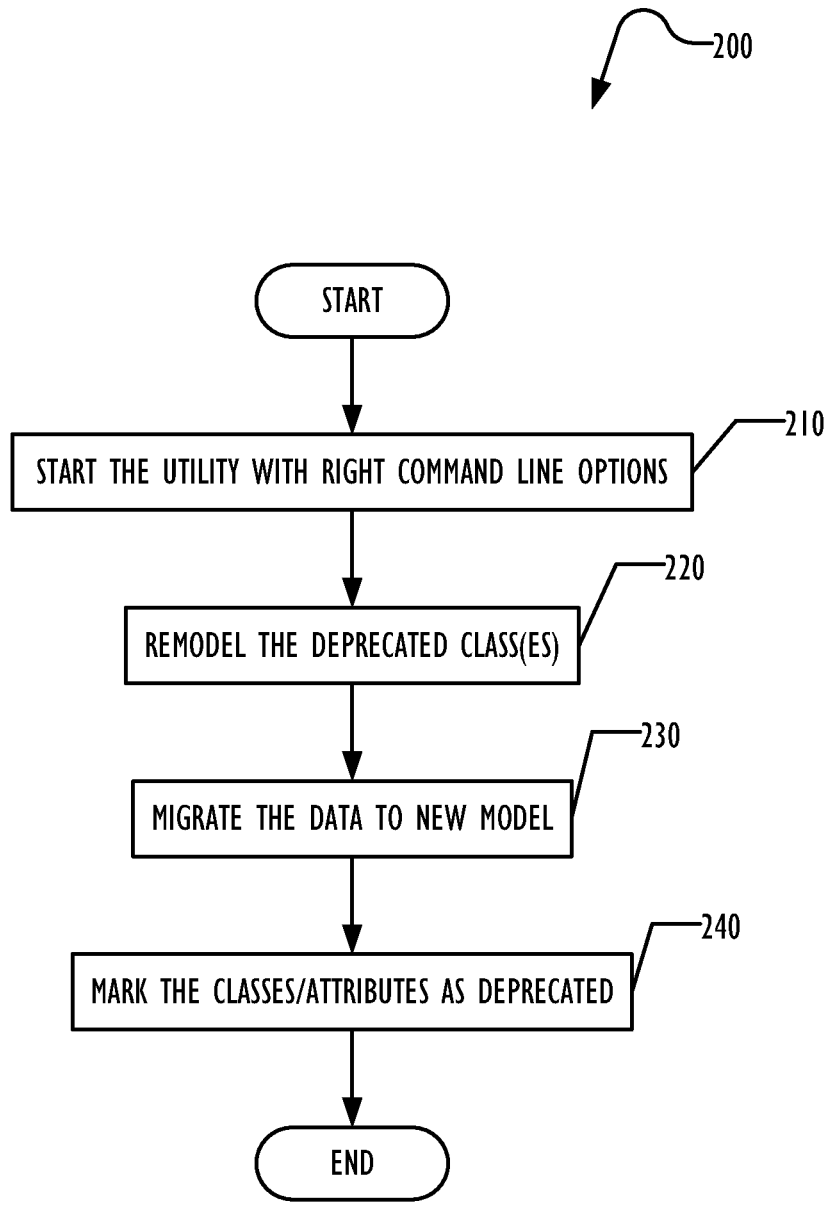
FIG. 2 illustrates, in flowchart form, an example of a technique for migrating deprecated object-oriented data according to one embodiment.

FIG. 2 is a flowchart illustrating one embodiment of a technique 200 that may be performed by the deprecation utility. In block 210 the deprecation utility may be started with desired command line options. In block 220, the utility may modify the internal structure of the CMDB to remodel the deprecated classes. In block 230, the utility may migrate the data to the new model, moving data from data structures associated with the deprecated classes or attributes to data structures associated with the replacement classes or attributes. Where the class or attribute is to be deprecated without replacement, the remodeling and data migration of blocks 220-230 may be skipped. In block 240, the utility may mark the classes or attributes to be deprecated as deprecated.

Figure 3:
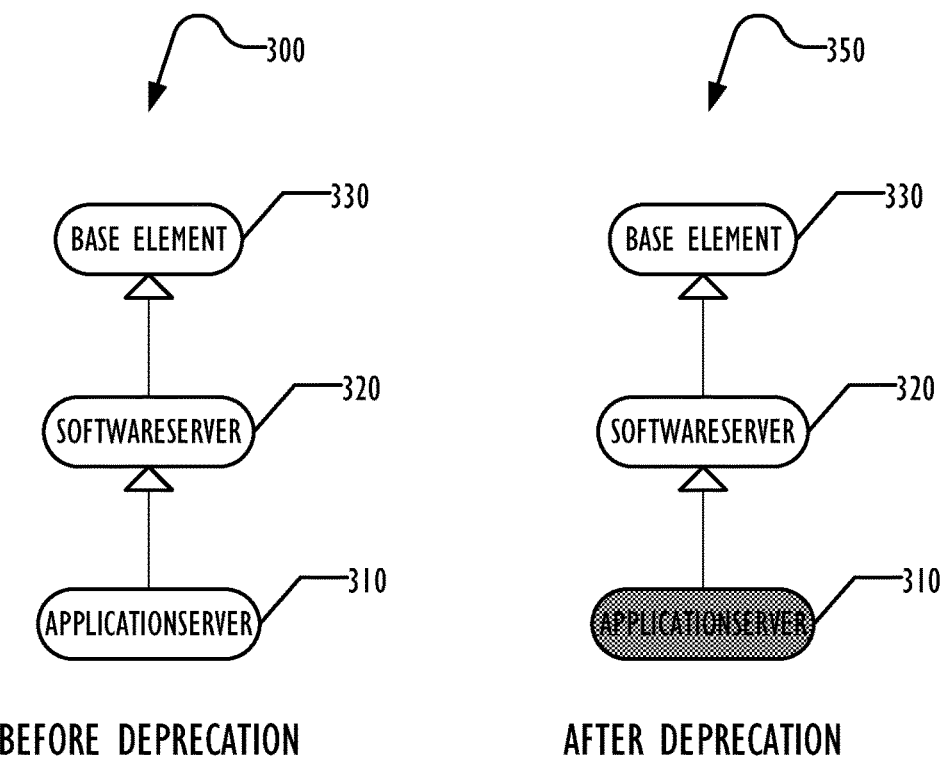
FIG. 3 illustrates, in block diagram form, an example of deprecating a class according to one embodiment.

FIG. 3 is a block diagram illustrating deprecation of a class and replacing it with its superclass. In this example, diagram 300 illustrates the class relationships prior to deprecation and diagram 350 illustrates the class relationships after deprecation. A class ApplicationServer 310 is obsolete and is to be replaced by its superclass SoftwareServer 320, which has a superclass of BaseElement 330. As illustrated by diagram 350, after deprecation, class ApplicationServer 310 is marked as deprecated, as indicated by the shading in the figure.

In one embodiment, forms are used as data structures for storing and accessing CMDB data. In such an embodiment, several types of forms may exist. A "Regular" form stores data in a regular database table. A "Join" form links Regular forms together and "Vendor" forms allow access to data from external data sources, which may or may not be stored in tables, and which may be local or remote. Vendor forms may require some programming to link to the other data source. The use of forms is illustrative and by way of example only, and other embodiments may use other data structures and techniques to allow users to enter or view data in the object-oriented data repository.

Figure 4:
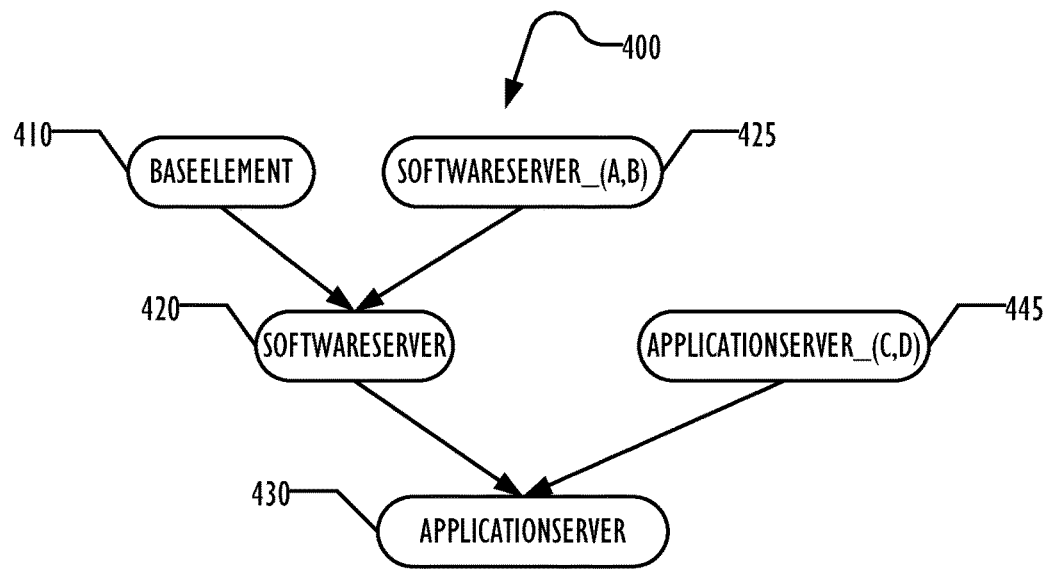
FIG. 4 illustrates, in block diagram form, an example of data migration according to one embodiment corresponding to the class deprecation of FIG. 3.
Figure 4:
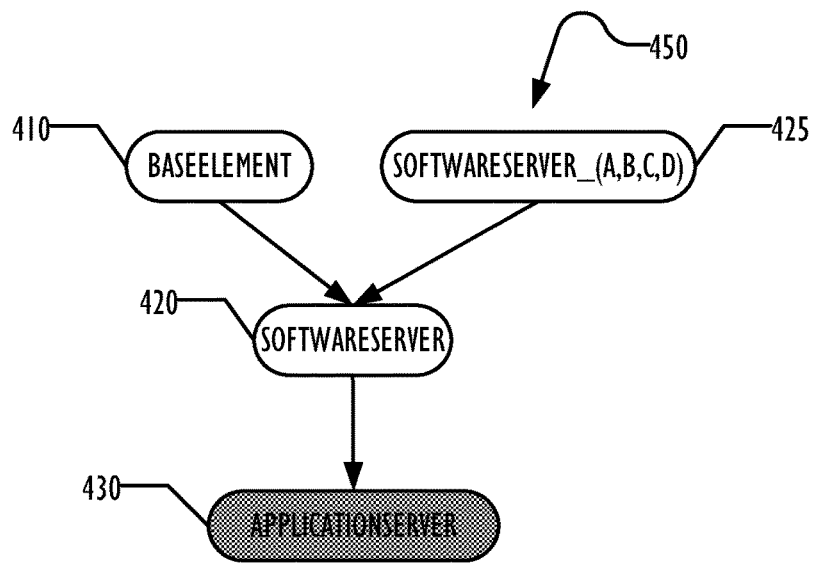

FIG. 4 is a block diagram illustrating an example of forms used for storing data in the CMDB corresponding to the classes illustrated in FIG. 3 according to one embodiment. Diagram 400 illustrates the forms before deprecation of the class ApplicationServer 310 in favor of the class SoftwareServer 320, while diagram 450 illustrates the forms after data has been migrated as a result of the deprecation of the class ApplicationServer. In this example, prior to deprecation a form ApplicationServer 430 is a join form linking form SoftwareServer 420 and base form ApplicationServer_445, which has fields C and D. Form SoftwareServer 420 is itself a join form joining form BaseElement 410 and base form SoftwareServer_425, which has fields A and B.

As illustrated in diagram 450, after deprecation of the class ApplicationServer 310, fields C and D are moved from the ApplicationServer class 310 to the SoftwareServer class by moving from the ApplicationServer_form 445 to the SoftwareServer_form 425. For data storage purposes the attributes now exist in SoftwareServer class 320 but fields C and D remain attributes of deprecated class ApplicationServer 310. After migration of the data for instances of the ApplicationServer class 310, the base form ApplicationServer_445 may be deleted.

The look and feel of the form ApplicationServer 430 does not change, but the definition of the form changes. In one embodiment, the post-deprecation form ApplicationServer 430 may be a vendor form that uses code to obtain data formerly in the ApplicationServer_445 form from the SoftwareServer form 420.

New or updated clients of the CMDB may use the SoftwareServer class 320 and old application clients of the CMDB may continue to use the deprecated ApplicationServer class 310. Instance operations performed by one client may be visible to another. For example, if a new client creates a SoftwareServer class 320 instance, then an existing client may access it as an instance of the ApplicationServer class 310. In order to do this, a user may provide a mapping qualification that is part of the mapping information. This qualification may be a set of criteria by which the CMDB may be configured to identify which instances of the SoftwareServer class 320 can be considered as instances of the ApplicationServer class 310.

In one embodiment, a deprecation module may be used to handle the interaction with deprecated classes. The deprecation module may handle get, set, create, and delete calls for CRUD operations. API calls made via the vendor form for the deprecated class may call methods of the deprecation module, which in turn make appropriate CMDB calls to manipulate the migrated data and any new data. The deprecation module may use the mapping created during the deprecation process to map calls into appropriate CMDB API calls and to map data between the deprecated and new class forms.

In the example above, unchanged old applications may continue to use the ApplicationServer form 430 without seeing any difference between the original join form 430 and the new vendor form 430 representing the deprecated class. The deprecation module may handle making CMDB API calls that take care of massaging the data.

Figure 5:
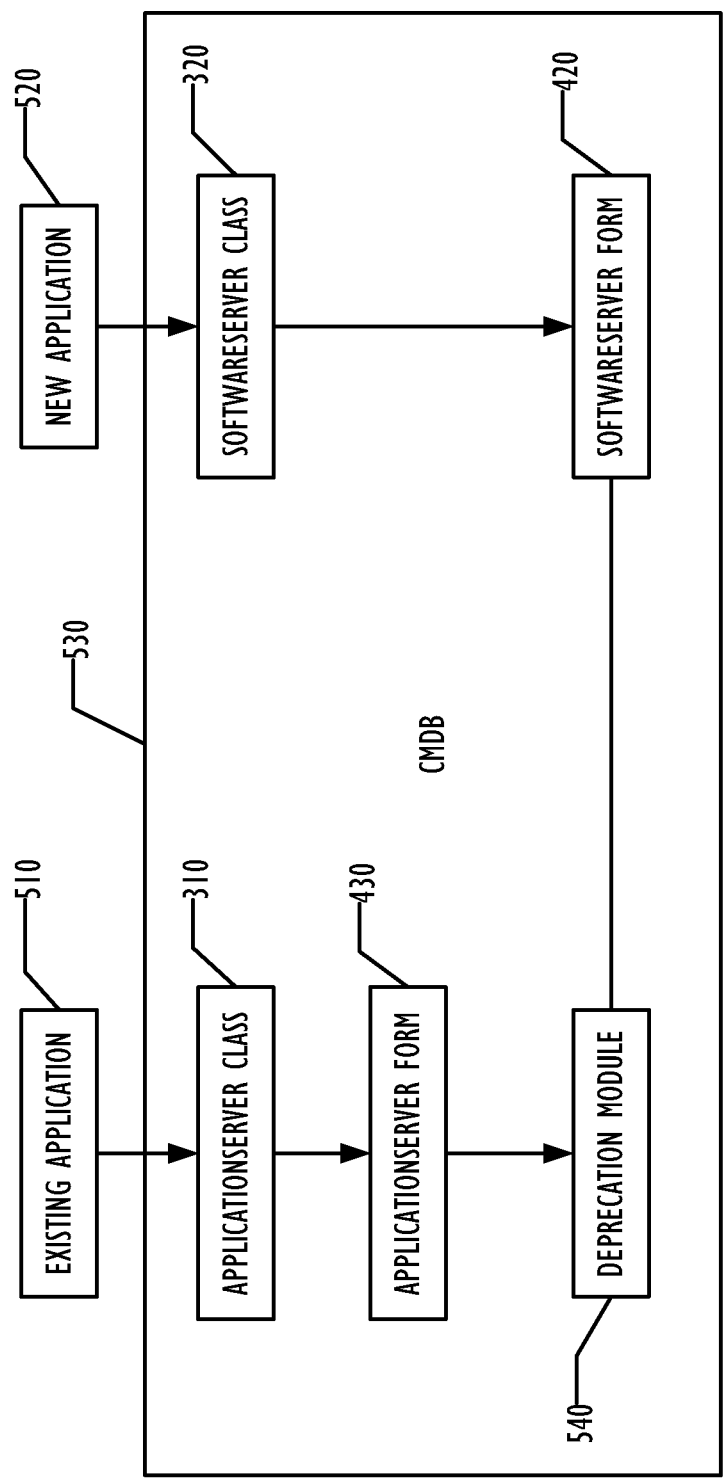
FIG. 5 illustrates, in block diagram form, an example further illustrating the scenario of FIGS. 3 and 4 according to one embodiment.

FIG. 5 is a block diagram further illustrating the scenario of FIGS. 3 and 4 according to one embodiment. An existing application 510 may make calls to the CMDB 530 for an instance of the ApplicationServer class 310 using the ApplicationServer form 430 and retrieve instances of the ApplicationServer class 310 without any changes needed in the application. Calls using the vendor form ApplicationServer 430 are handled by the deprecation module 540, which in turn uses the new mapping to access what are now instances of the SoftwareServer class 320, using the SoftwareServer form 420 (and related forms BaseElement 410 and SoftwareServer_425, not shown for clarity). The deprecation module 540 handles the manipulation of the call from the ApplicationServer form 430 and the responses obtained as a result so that the existing application 510 may continue to function unchanged. At the same time, a new application may make calls to the CMDB 530 for an instance of the SoftwareServer class 320 using the SoftwareServer form 420 and retrieve the same data retrieved by the existing application 510, but now as instances of the SoftwareServer class 320. The deprecation module 540 is not involved with calls made by the new application 520.

When deprecating classes, relationship instances that involve the deprecated class may also be changed. The relationship instances have the class IDs of the source and destination endpoints of the relationship. So when any of the end point classes is deprecated and replaced with another class, the relationship instances may be updated with the class ID of the replacement class. For example, using the example of FIG. 3, if there is a relationship between a CI that is an instance of BaseElement 330, and another CI that is an instance of ApplicationServer classID 310, then relationship data may be changed to replace the class ID ApplicationServer 310 with the class ID SoftwareServer 320 as the source or destination class ID.

Figure 6:
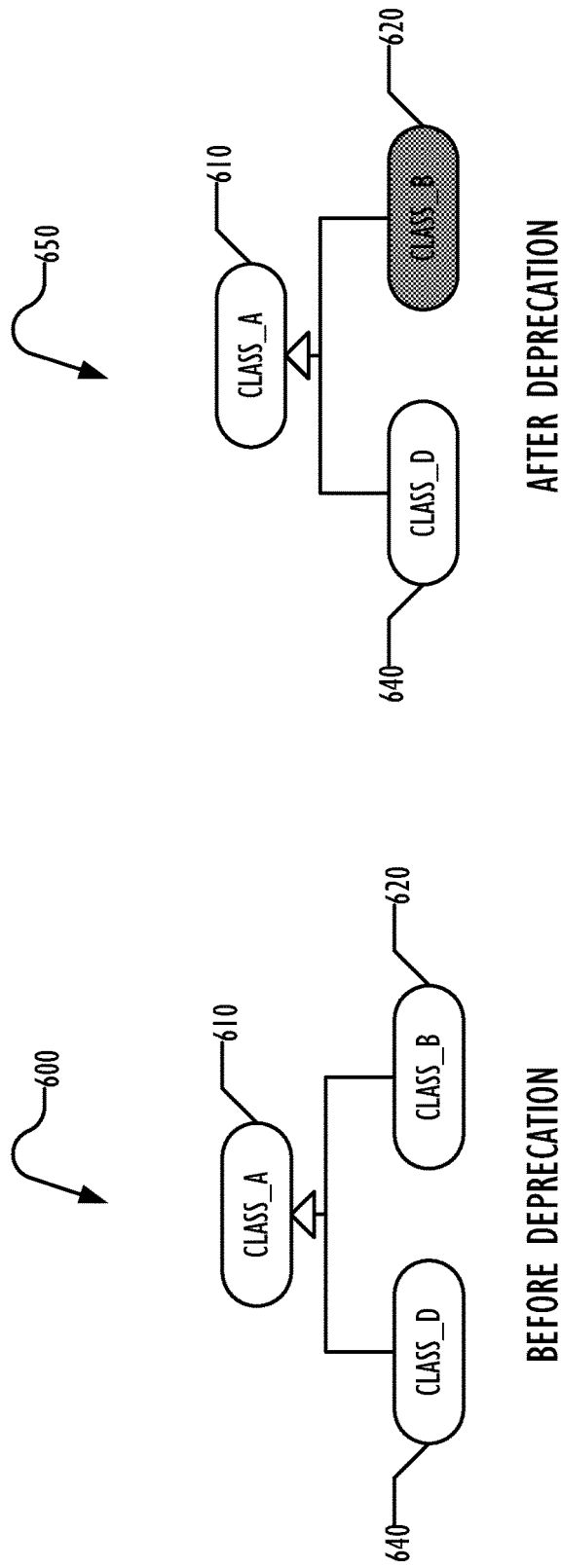
FIG. 6 illustrates, in block diagram form, an example of mapping a class to a sibling class according to one embodiment.

FIG. 6 is a block diagram illustrating another example of deprecation of a class according to one embodiment, in this example moving the deprecated class to a sibling class. Diagram 600 illustrates the class structure in this example prior to deprecation, and diagram 650 illustrates the class structure in this example after deprecation. Class_A 610 is a superclass of sibling classes Class_D 640 and Class_B 620. Class_B 620 is deprecated and replaced by its sibling Class_D 640, as indicated by the shading of Class_B 620 and diagram 650. All of the attributes of Class_B 620 are moved to the attributes of Class_D 640, and all instances of the deprecated class will become instances of its sibling.

Figure 7:
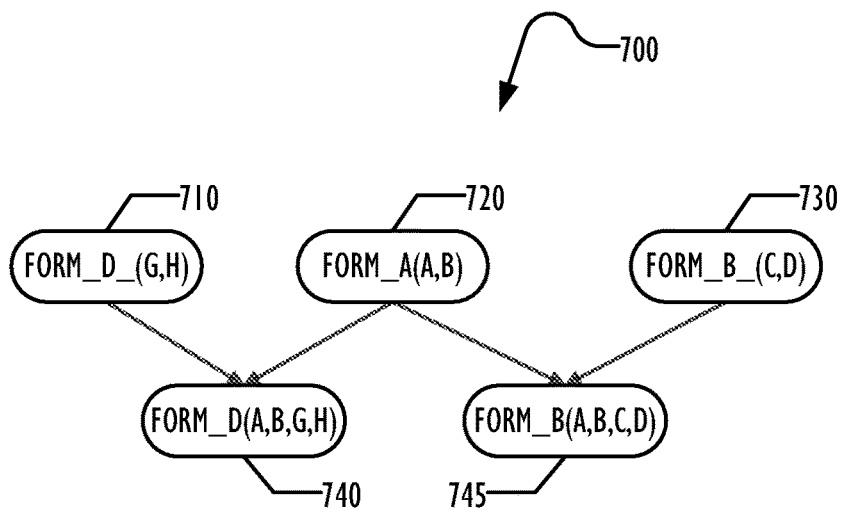
FIG. 7 illustrates, in block diagram form, an example of migrating class data in forms according to one embodiment corresponding to the mapping of FIG. 6.
Figure 7:
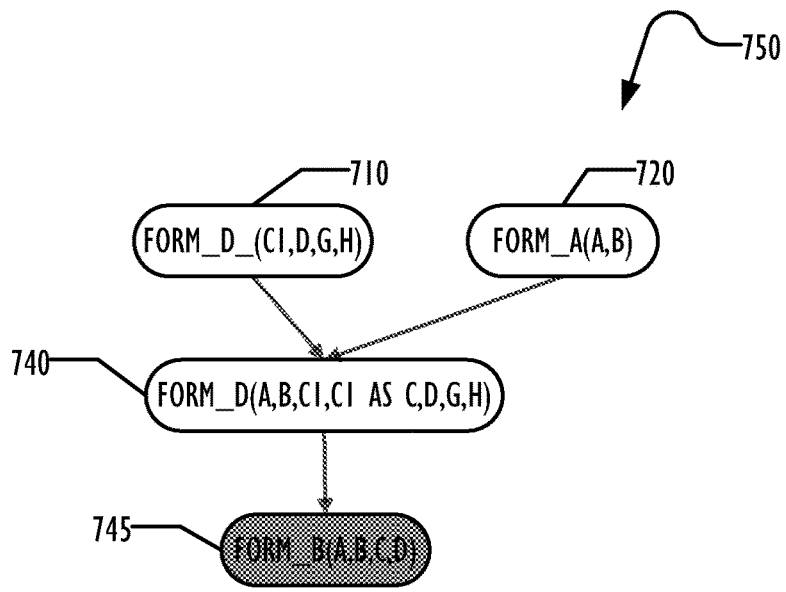

FIG. 7 is a block diagram illustrating the scenario of FIG. 6, showing the changes in forms and migration of data caused by the deprecation according to one embodiment.

Diagram 700 illustrates the forms and attributes prior to deprecation and diagram 750 illustrates the forms and attributes after deprecation of Class_B 620. Form 745 is a join form joining information on attributes A and B from form 720 and on attributes C and D from form 730. Form 740 is a join form joining information on attributes G and H from form 710 and attributes A and B from form 720.

In this example, attribute C is mapped to a new attribute C1, while attribute D is not mapped to a new attribute, but merely moved. After deprecation, form 745 is a vendor form obtaining information from vendor form 740, mapping attribute C1 as C. Form 740 continues to join forms 710 and 720. Form 740 handles attributes A, B, G, and H, as before, but also handles attributes C1, C1 as C, and D. After migration of the data, form 730 may then be deleted. In some embodiments, form 730 may be retained until the deprecated class is finally deleted.

In some embodiments, subclasses of deprecated classes may also be deprecated and their corresponding forms changed as described above.

Figure 8:
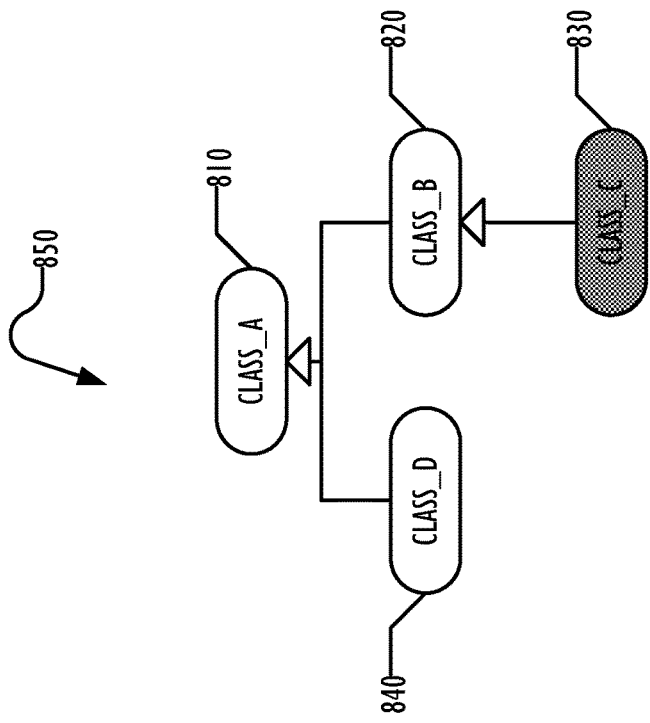
FIG. 8 illustrates, in block diagram form, an example of mapping a leaf class to its parent's sibling according to one embodiment.
Figure 8:
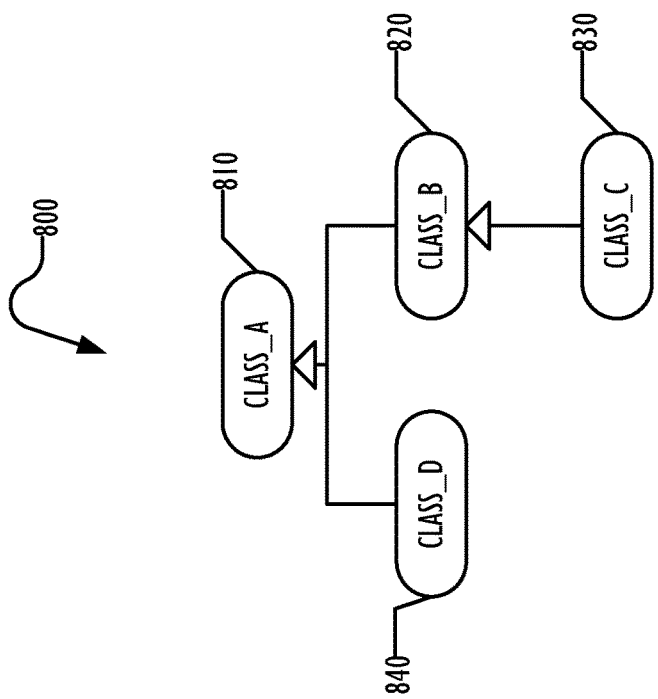

FIG. 8 is a block diagram illustrating another scenario according to one embodiment. In this example, a subclass is deprecated and replaced by a sibling of its superclass. Diagram 800 illustrates the class structure prior to deprecation, and diagram 850 illustrates the structure after deprecation, with the deprecated subclass shaded. In this example, subclass Class_C 830 is deprecated and replaced by Class_D 840, which is a sibling of Class_B 820, the superclass of subclass Class_C 830. Both Class_D 840 and Class_B 820 share a common superclass Class_A 810.

Figure 9:
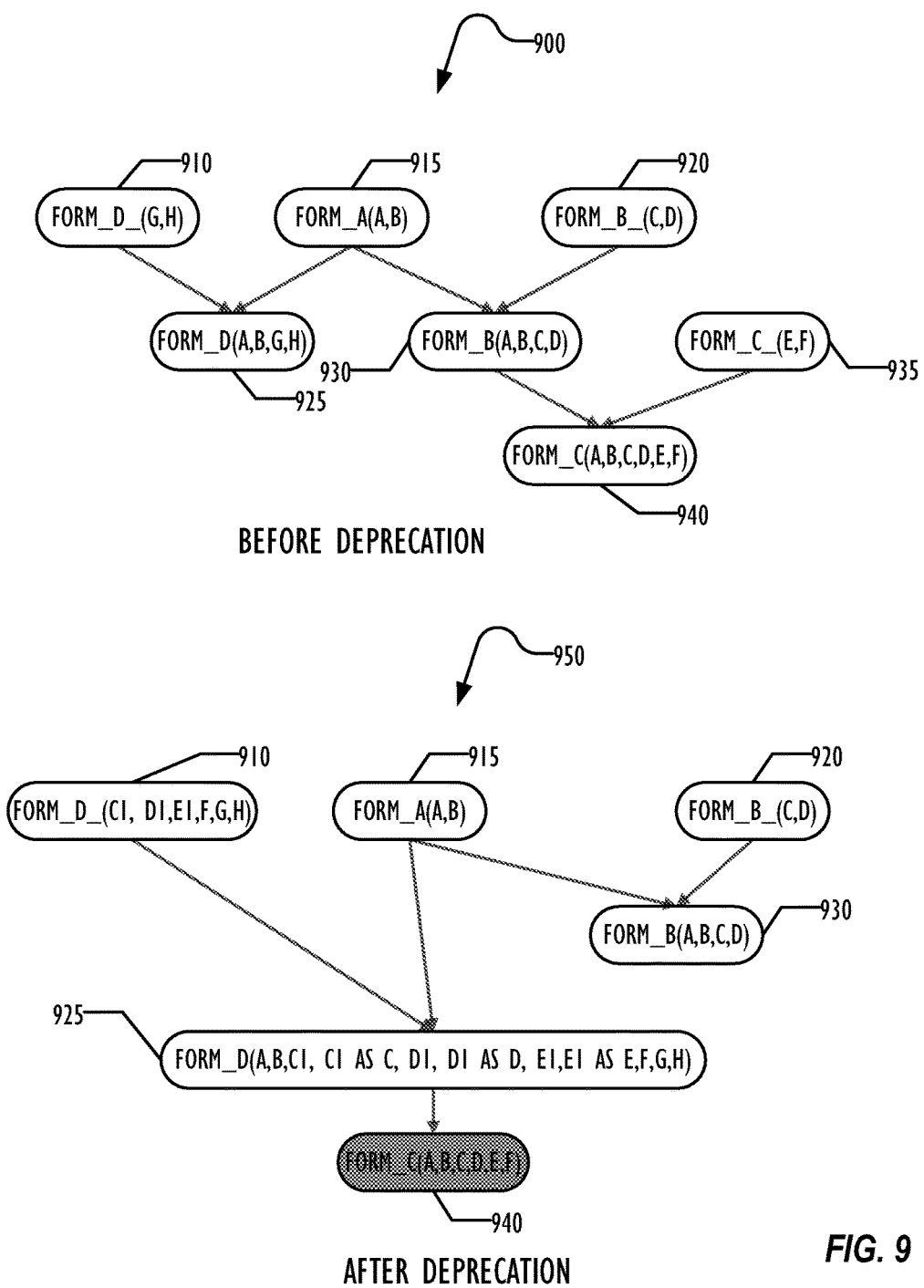
FIG. 9 illustrates, in block diagram form, an example of migrating class data in forms according to one embodiment corresponding to the mapping FIG. 8.

FIG. 9 is a block diagram illustrating the example of FIG. 8, showing the changes in forms and migration of data caused by the deprecation according to one embodiment. Diagram 900 illustrates the forms and attributes prior to deprecation and diagram 950 illustrates the forms and attributes after deprecation of Class_C 830. Form 940 is a join form joining information on attributes A, B, C, and D from form 930 and information on attributes E and F from form 935. Form 930 is itself a join form getting attributes A and B from form 915 and attributes C and D from form 920. Form 925 is a join form joining information on attributes G and H from form 910 and attributes A and B from form 915.

Diagram 950 illustrates the form structure and attributes after deprecation of Class_C 830, in this example mapping attributes C (into a new attribute C1), D (into a new attribute D1), E (into a new attribute E1), and F (unchanged) into form 910. Form 940 is changed from a join form into a vendor form that obtains all of its attributes from form 925. Form 910 now handles attributes C1, D1, E1, F, G, and H. Form 925 handles attributes A and B, obtained from form 915, as well as attributes C1, C1 as C, D1, D1 as D, E1, E1 as E, F, G, and H, obtained from form 910. Vendor form 940 obtains all of its attributes from form 925.

In a scenario where a class is to be deprecated and replaced by a class in a completely different hierarchy, then mapping of attributes may be done to the root class level of the new hierarchy. In such a scenario, relationship CIs do not have any common classes and the relationship may be deprecated if it involves the deprecated class or its subclasses.

Like a regular class, a relationship class may also be deprecated. If the relationship consists of R(A, B), where A and B are endpoint classes of relationship R, then this class may be migrated to relationship class R1(A1, B1), if classes A1 and B1 are superclasses of A and B, respectively and with a no less permissive cardinality constraint. All of the scenarios for regular classes may be applicable to relationship classes as well.

In some embodiments an attribute may also be deprecated if it is moving or be modified in the same class. For example, an attribute may be deprecated by being renamed or changing its data length. However, an attribute that is moving from one class to another is an example of deprecation of a class instead of deprecation of an attribute. Attribute deprecation involves mapping of the attributes in the same class.

In order to perform class deprecation, in one embodiment a data structure is used to store mappings for deprecated classes in the CMDB as configuration classes. This avoids the need to provide special APIs for maintaining the mappings or to create special export/import functionality for the mapping data. In one embodiment, a new class may be added to the CMDB to store the class mapping information with the following attributes: (a) OriginalClassID, (b) OperationType, (c) MappedClassID, (d) ApplicationName, (e) ApplicationVersion, (f) Deprecation Phase, (g) DeprecationStatus, and (h) Qualification.

The OriginalClassID attribute is the class ID of the deprecated class. The OperationType attribute indicates whether the deprecation is a simple deletion of a class or replacement of the class by another class. The Qualification attribute may be used to indicate instances of the replacement class that can be recognized as instances of the deprecated class. The MappedClassID attribute is the class ID of the replacement class. The ApplicationName and ApplicationVersion attributes indicate the application that deprecated this class. The DeprecationPhase attribute indicates whether the class has been fully deprecated or is still in the process of being deprecated. The DeprecationStatus attribute indicates whether the class is a candidate for deprecation or has been deprecated.

In addition, a new class may be added to the CMDB for attribute mapping information. In one embodiment, the new class may have the following attributes: (a) ClassMappingID, (b) OriginalAttributeID, (c) OperationType, (d) NewAttributeID, (e) ApplicationName, (f) the ApplicationVersion, (g) DeprecationStatus, and (h) DefaultValue. In one embodiment, one attribute may be mapped to only one attribute. In one embodiment, an attribute mapping may only be done between attributes of the same data type.

The ClassMappingID attribute is a foreign key for this entry. The OriginalAttributeID attribute is the attribute ID of the deprecated attribute. The OperationType attribute indicates whether the deprecation is a simple deletion or a replacement. The MappedAttributeID attribute is the attribute ID of the new attribute that is replacing the deprecated attribute. The DefaultValue attribute is a default value of the replacement attribute if an instance of the deprecated classes moved. For example, if the class J2EEApplicationServer is deprecated and the target class is ApplicationServer, then there may be an attribute called AppServerType that may be set to J2EEAppServer by default when the instance of J2EEApplicationServer is moved to the ApplicationServer class. The ApplicationName and ApplicationVersion attributes indicate the application that deprecated this class. The DeprecationStatus attribute indicates whether the class is a candidate for deprecation or has been deprecated.

In addition to the mapping classes described above, in one embodiment existing class properties and attribute properties may be extended to include the property IsDeprecated, indicating whether the class or attribute has been deprecated.

Figure 10:
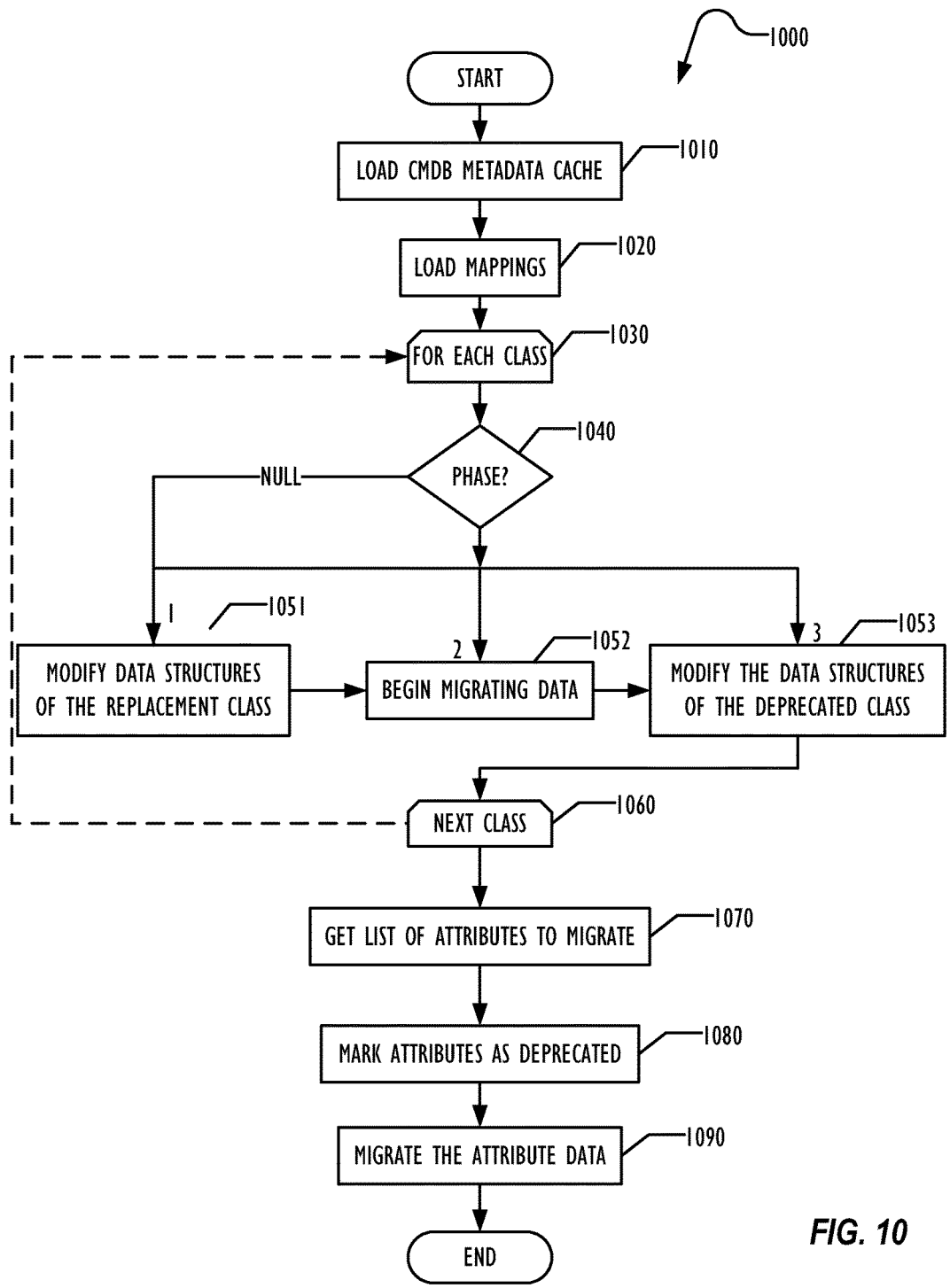
FIG. 10 illustrates, in flowchart form, a technique for deprecation according to one embodiment.

In one embodiment, the deprecation migration utility may be implemented in the Java programming language. FIG. 10 is a flowchart illustrating an example technique 1000 for a deprecation migration utility according to one embodiment. In block 1010, the CMDB metadata cache may be loaded. In block 1020, the mappings of deprecated classes and attributes may be loaded. In block 1030 a list of classes to deprecate is identified and blocks 1040 through 1053 are performed for each class to be deprecated. In this embodiment, the migration process may be divided into multiple phases. In block 1040, the utility may determine the phase of the deprecation for the CI. If it is at phase 1, then in block 1051 appropriately modify data structures of the replacement class. It is in phase 2, begin migrating the data in block 1052. If it is in phase 3, appropriately modify the data structures of the deprecated class in block 1053. If the phase indication is null, indicating the deprecation process has not begun, begin with block 1051. Phase 1 is followed by phase 2, which is followed by phase 3. In some embodiments, phases 2 and 3 may be performed in the opposite order.

Then in block 1060 the next class is determined and the above processing repeated for each class. In block 1070, the utility obtains a list of attributes to migrate from the mapping loaded in block 1020. In block 1080, the attributes are marked as deprecated. In block 1090, the attribute data is migrated.

In one embodiment, the deprecation utility is multi-threaded, with the number of threads configurable via a command line option, allowing concurrent processing of multiple deprecations.

Figure 11:
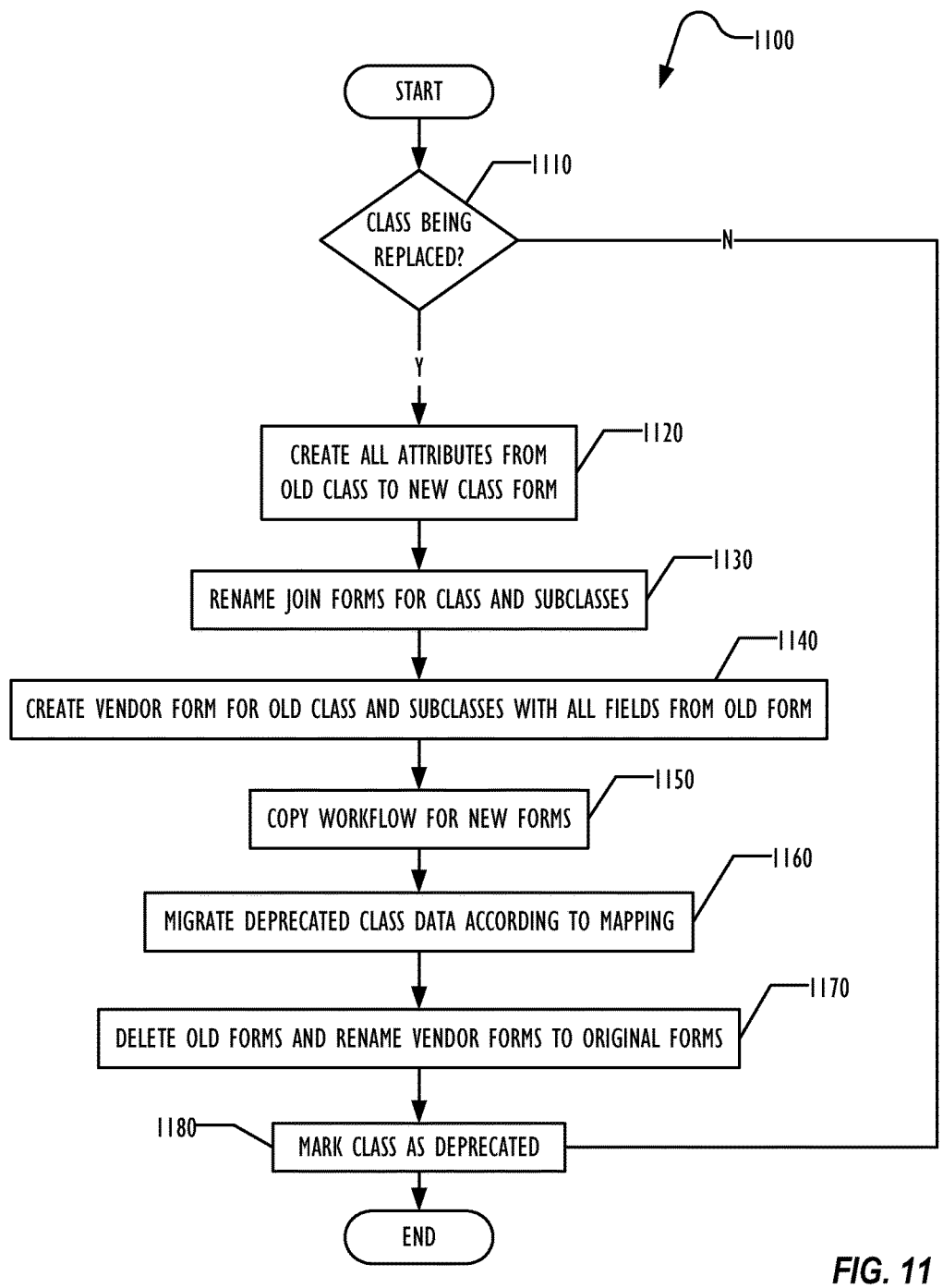
FIG. 11 illustrates, in flowchart form, a technique for making data model changes for a class mapping according to one embodiment

FIG. 11 is a flowchart illustrating an example technique 1100 for making data model changes for a class mapping according to one embodiment. In block 1110, if the class is not being replaced, the class may be marked as deprecated in block 1180, completing the processing of that class. In block 1120, all the attributes from the old class may be created in the new class form. The attribute properties may remain the same in the new class as they were in the old class.

In block 1130, the join forms for the class and the subclasses may be renamed. In block 1140, a vendor form for the old class and the subclasses with all fields of the old form may be created. In block 1150, the workflow from the old forms may be copied into the forms. In block 1160 the deprecated class data may be migrated according to the mapping. After all of the data model changes for the deprecated classes are performed, in block 1170, the old forms may be deleted and the new forms renamed to the original name of the original forms, before marking the class as deprecated in block 1180.

At some future time, the deprecated classes and attributes may be deleted. In some embodiments, the future upgrade to the CMDB also handles the deletion of the deprecated classes and attributes. The migration utility in one embodiment has a command line option to delete deprecated classes attributes.

Figure 12:
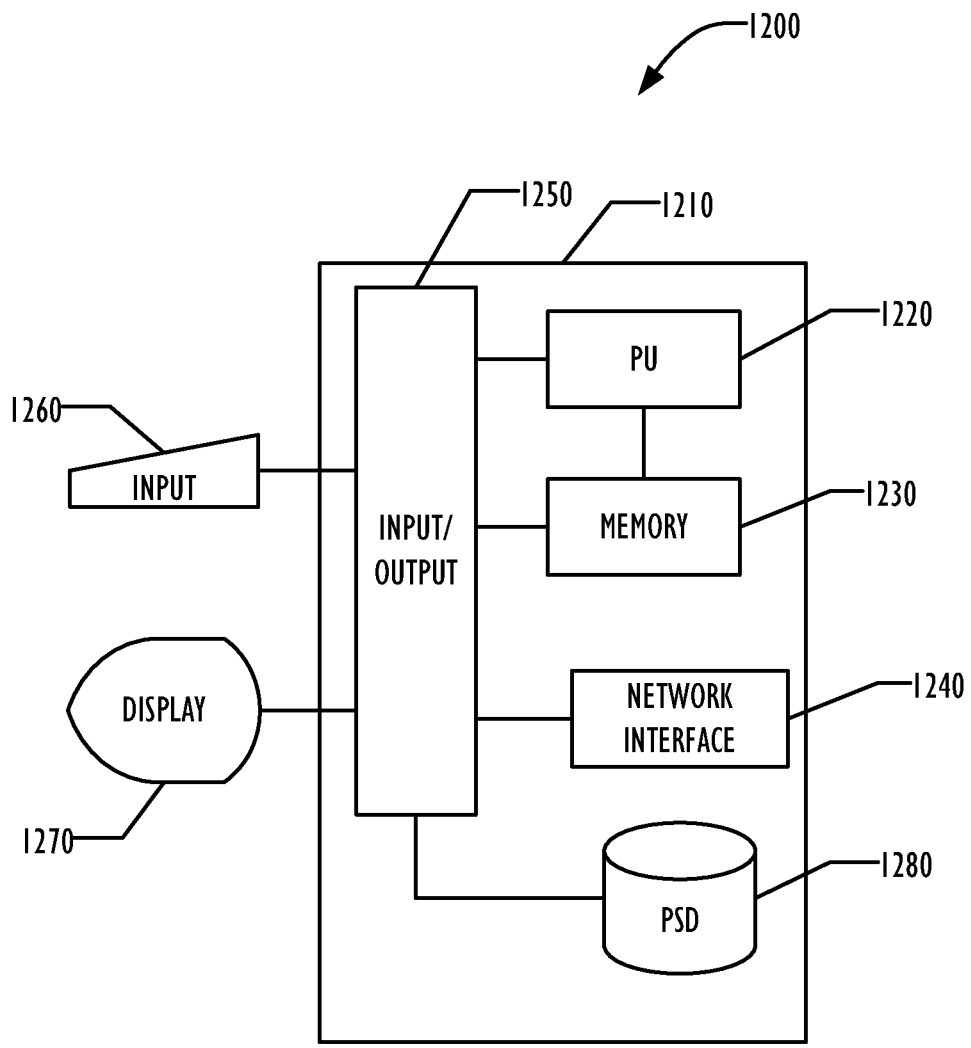
FIG. 12 illustrates, in block diagram form, an example of a computing device for performing embodiments of the disclosed techniques.

Referring now to FIG. 12, an example computer 1200 for use in deprecating object-oriented data is illustrated in block diagram form. Example computer 1200 comprises a system unit 1210 which may be optionally connected to an input device or system 1260 (e.g., keyboard, mouse, touch screen, etc.) and display 1270. A program storage device (PSD) 1280 (sometimes referred to as a hard disc) is included with the system unit 1210. Also included with system unit 1210 is a network interface 1240 for communication via a network with other computing and corporate infrastructure devices (not shown). Network interface 1240 may be included within system unit 1210 or be external to system unit 1210. In either case, system unit 1210 will be communicatively coupled to network interface 1240. Program storage device 1280 represents any form of non-volatile storage including, but not limited to, all forms of optical and magnetic storage elements including solid-state storage, including removable media, and may be included within system unit 1210 or be external to system unit 1210. Program storage device 1280 may be used for storage of software to control system unit 1210, data for use by the computer 1200, or both.

System unit 1210 may be programmed to perform methods in accordance with this disclosure (an example of which is in FIG. 1). System unit 1210 comprises a processor unit (PU) 1220, input-output (I/O) interface 1250 and memory 1230. Processing unit 1220 may include any programmable controller device including, for example, one or more members of the Intel Core®, Pentium® and Celeron® processor families from the Intel and the Cortex and ARM processor families from ARM. (INTEL, CORE, PENTIUM, and CELERON are registered trademarks of the Intel Corporation. CORTEX is a registered trademark of the ARM Limited Corporation. ARM is a registered trademark of the ARM Limited Company.) Memory 1230 may include one or more memory modules and comprise random access memory (RAM), read only memory (ROM), programmable read only memory (PROM), programmable read-write memory, and solid-state memory. One of ordinary skill in the art will also recognize that PU 1220 may also include some internal memory including, for example, cache memory.

Figure 13:
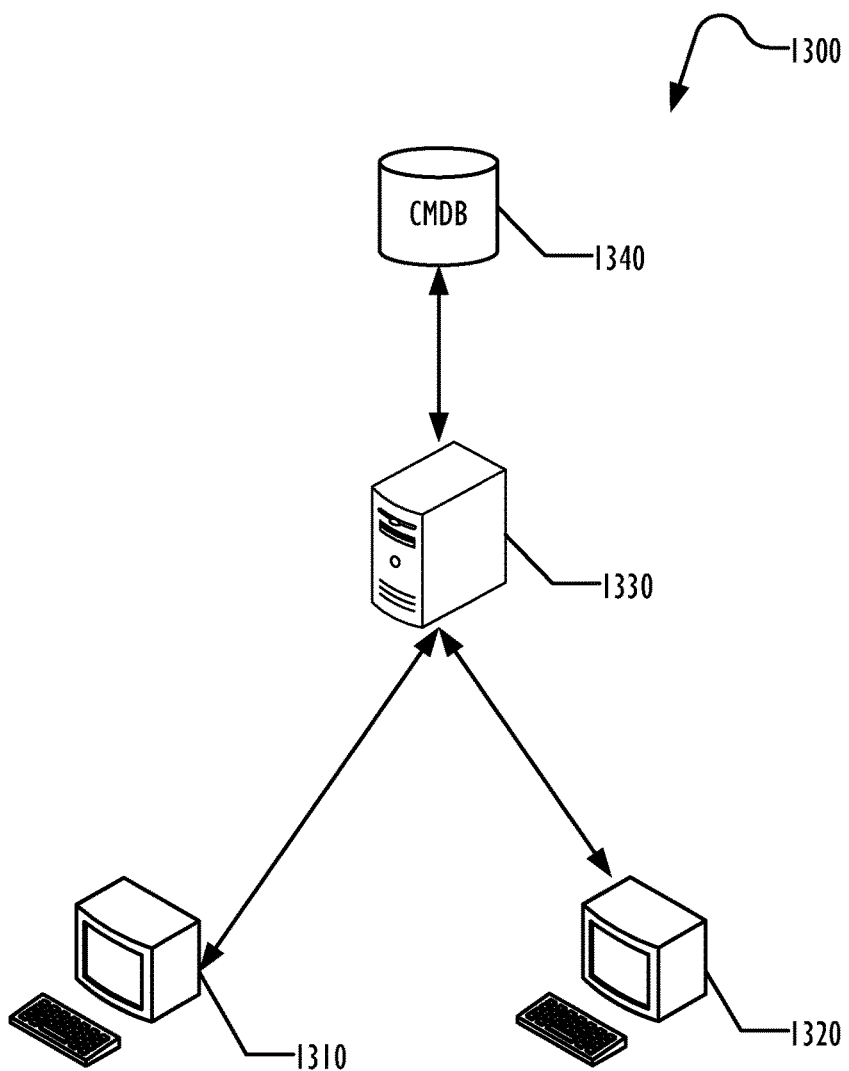
FIG. 13 illustrates, in block diagram form, an example of a network of computing devices for performing embodiments of the disclosed techniques.

FIG. 13 is a block diagram illustrating an example system 1300 that embodies the deprecation techniques described above. An application executing in computer 1310 may continue to execute unchanged even though classes, attributes, and data have been deprecated as described above. Another application executing in computer 1320 may also execute using the classes, attributes, and migrated data based on the new data model. Thus, applications may execute using both deprecated classes and the replacement classes as described above. A server 1330 may provide services for the CMDB 1340, including execution of the deprecation utility and the data migration utility described above. Although illustrated in FIG. 13 as a single server 1330, multiple servers may provide the CMDB and the deprecation functionality described above.

Various changes in the components as well as in the details of the illustrated operational method are possible without departing from the scope of the following claims. For instance, the illustrative system of FIG. 13 may be comprised of more than one computer communicatively coupled via a communication network, wherein the computers may be mainframe computers, minicomputers, workstations or any combination of these. Such a network may be composed of one or more local area networks, one or more wide area networks, or a combination of local and wide-area networks. In addition, the networks may employ any desired communication protocol and further may be "wired" or "wireless." In addition, acts in accordance with FIGS. 1-2 and 10-11 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A computer system comprising:
   at least one processor; and
   a memory storing a data model of a database, the data model including at least a first class and a second class, the memory also storing instructions that, when executed by the at least one processor, cause the system to perform operations comprising:
      selecting the second class of the data model as a replacement for the first class,
      moving data associated with the first class from data structures associated with the first class in the database to data structures associated with the second class in the database, and
      marking the first class as deprecated,
      wherein the moving enables operations that access the data structures associated with the second class to access the data associated with the first class.

2. The computer system of claim 1, wherein the operations further comprise:
   marking a plurality of subclasses of the first class as deprecated; and
   triggering replacement of each respective subclass with a sibling of a superclass of the first class as a replacement for the respective subclass.

3. The computer system of claim 1, wherein the operations further comprise:
   mapping an API call made via a vendor form to a database API; and
   mapping data obtained in a format for the second class to a format for the first class.

4. The computer system of claim 1, wherein the operations further comprise:
   in response to an operation accessing the first class, generating a message indicating a suggested application modification to eliminate use of the first class.

5. The computer system of claim 1, wherein the operations further comprise:
   deprecating at least one attribute of the first class and replacing the at least one attribute with a new attribute in the second class that is of the same data type as the at least one attribute being deprecated.

6. The computer system of claim 1, wherein the operations further comprise:
   generating at least one configuration class for mapping the first class to the second class; and
   accessing the at least one configuration class to access the data structures associated with the second class.

7. The computer system of claim 6, wherein mapping the first class to the second class is performed as part of an update to the database.

8. A method comprising:
   obtaining access to a database storing a data model including at least a first class and a second class;
   marking the first class of the data model as deprecated;
   selecting the second class of the data model as a replacement for the first class;
   moving data associated with the first class from data structures associated with the first class in the database to data structures associated with the second class in the database;
   marking the first class as deprecated; and
   redirecting operations that access the data structures associated with the first class to access the data structures associated with the second class,
   wherein the moving enables operations that access the data structures associated with the second class to access the data associated with the first class.

9. The method of claim 8, further comprising:
   marking a plurality of subclasses of the first class as deprecated; and
   triggering replacement of each respective subclass with a sibling of a superclass of the first class as a replacement for the respective subclass.

10. The method of claim 8, wherein the redirecting includes:
    mapping an API call made via a vendor form to a database API; and
    mapping data obtained in a format for the second class to a format for the first class.

11. The method of claim 8, further comprising:
    in response to an operation accessing the first class, generating a message indicating a suggested application modification to eliminate use of the first class.

12. The method of claim 8, further comprising:
    deprecating at least one attribute of the first class and replacing the at least one attribute with a new attribute in the second class that is of the same data type as the at least one attribute being deprecated.

13. The method of claim 8, further comprising:
    generating at least one configuration class for mapping the first class to the second class,
    wherein the redirecting includes accessing the at least one configuration class to access the data structures associated with the second class.

14. The method of claim 13, wherein mapping the first class to the second class is performed as part of an update to the database.

15. A computer-readable medium comprising:
    at least one processor; and
    a memory storing a data model for a computer-implemented database, the data model including a plurality of classes, the memory also storing instructions that, when executed by the at least one processor, cause the at least one processor to perform operations comprising:
       receiving a request to deprecate a portion of classes of the plurality of classes,
       selecting, for each class in the portion, a respective replacement class for the class in the portion of classes, and
       migrating data associated with each instance of each class in the portion of classes to an instance of each respective replacement class by:

marking each class in the portion of classes as deprecated, configuring, for each class in the portion of classes, a mapping of each element in the class to an existing or new element in the respective replacement class, and moving data associated with the instances of each class in the portion of classes to at least one instance of the respective replacement class in the database.

16. The computer-readable medium of claim 15, wherein deprecating the portion of classes is performed in a multi-threaded process.

17. The computer-readable medium of claim 15, wherein the migration is configured to be performed unless a predefined deprecation period is expired.

18. The computer-readable medium of claim 15, wherein the operations further comprise:

marking a plurality of subclasses of at least one of the plurality of classes as deprecated; and triggering replacement of each respective subclass with a sibling of a superclass of at least one of the plurality of classes as a replacement for the respective subclass.

19. The computer-readable medium of claim 15, wherein the operations further comprise:

redirecting operations that access the instances of each class in the portion of classes to access the instances of the respective replacement classes, wherein the moving enables operations that access the instances of the respective replacement classes to access the data associated with the instances of classes in the portion of classes.

20. The computer-readable medium of claim 19, wherein the operations further comprise:

deprecating at least one attribute of the classes in the portion of classes and replacing the at least one attribute with a new attribute that is of the same data type as the at least one attribute being deprecated.

* * * * *